R. C. LINDSTEN.
GRAIN DRILL.
APPLICATION FILED JULY 25, 1913.

1,233,375.

Patented July 17, 1917.
7 SHEETS—SHEET 5.

Witnesses

Inventor
Reuben C. Lindsten.
By Victor J. Evans
Attorney

UNITED STATES PATENT OFFICE.

REUBEN C. LINDSTEN, OF BERTRAND, NEBRASKA.

GRAIN-DRILL.

1,233,375.

Specification of Letters Patent.    Patented July 17, 1917.

Application filed July 25, 1913. Serial No. 781,262.

*To all whom it may concern:*

Be it known that I, REUBEN C. LINDSTEN, a citizen of the United States, residing at Bertrand, in the county of Phelps and State of Nebraska, have invented new and useful Improvements in Grain-Drills, of which the following is a specification.

This invention relates to grain drills, and it has for its object to produce a grain drill which will be adapted for corn field work as well as for open field work; that is to say, a drill which while capable of being successfully used for open field work will be especially adapted for use in corn fields where, owing to its peculiar construction, it may be freely used without danger of breaking down or injuring the stalks of the growing corn.

A further object of the invention is to produce a grain drill capable of straddling a row of corn and equipped with presser wheels to press and compact the soil over the seed that is being drilled.

A further object of the invention is to produce a corn field drill of the class described which may be drawn by four horses hitched abreast with an equalized draft.

A further object of the invention is to produce a simple and improved construction whereby the drills may be moved together or apart at the will of the operator during the operation of the machine, the construction being, moreover, of such a nature that the draft will always be on center.

A further object of the invention is to simplify and improve the mounting and arrangement of the furrow opening disks.

Further objects of the invention are to simplify and improve the general construction, arrangement and operation of the parts of the improved machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Corresponding parts in the several figures are denoted by like characters of reference.

In the construction of the improved machine, it will be understood that it may be made of dimensions to operate in the interspaces between three or more rows of corn. For practical purposes it is thought, however, that a machine comprising two drill gangs and adapted to work in the interspaces between three rows of corn will be most practicable, and such a machine has accordingly been illustrated. Assuming that the corn rows are three feet six inches apart, the main top frame bars, front and rear, designated, respectively, by 20 and 21, must be ten feet six inches in length, so as to extend entirely across three rows of corn and midway into the adjacent interspaces. Said top frame bars must also be supported at a suitable elevation to clear the corn stalks that have attained a considerable growth, but this elevation may, of course, be varied. It is to be understood that the machine is to be used for drilling seed, especially fall wheat, between the rows of corn after the latter has attained a stage of growth that will not permit an ordinary drill to be used.

The top frame bars, front and rear, are connected together midway between their ends by a longitudinal frame bar 22. Similar longitudinal bars 23 connect the front and rear bars 20, 21 together some distance from the ends thereof, said bars 23 being spaced from the center a distance of three feet six inches to be equal to the distance between the corn rows, the object being that the center bar 22 and the side bars 23 shall precisely aline with the rows of corn. Connecting members, such as plates 24, of cast iron, or other material, serve to connect the center bar 22 and the side bars 23 with the front and rear bars 20, 21, the parts being assembled by means of bolts or the like; braces 25 have also been shown at the corners of the frame structure. It may here be noted that in the construction of the entire frame of the machine, tubular metallic bars of rectangular cross section have been indicated wherever practicable, it being, however, understood that no limitation is intended to the use of any particular material.

Connected with the front top bar 20 and extending downwardly from the ends thereof are brackets or arms 26 which are reinforced by inclined braces 27 extending from the lower ends thereof to the bar 20 with which said braces are connected at a suitable distance from the ends thereof. The lower ends of the brackets 26 are also connected by inclined longitudinal braces 28 with the rear top bar 21, thus strongly reinforcing the brackets 26 which, as will presently hereinafter appear, are utilized as draft members. Connected with the front top bar 20 are also two yokes A each comprising two downwardly convergent side bars 29 and a bridge member or cross bar 30 connected with and supported by said side bars. The yokes A are placed equidistant from the center of the top bar 20, and the lower ends of the side members 29 of the respective yokes are connected with the top bar 20 by obliquely disposed braces 31, whereby the parts are strongly reinforced.

Figures 6, 7, 8:
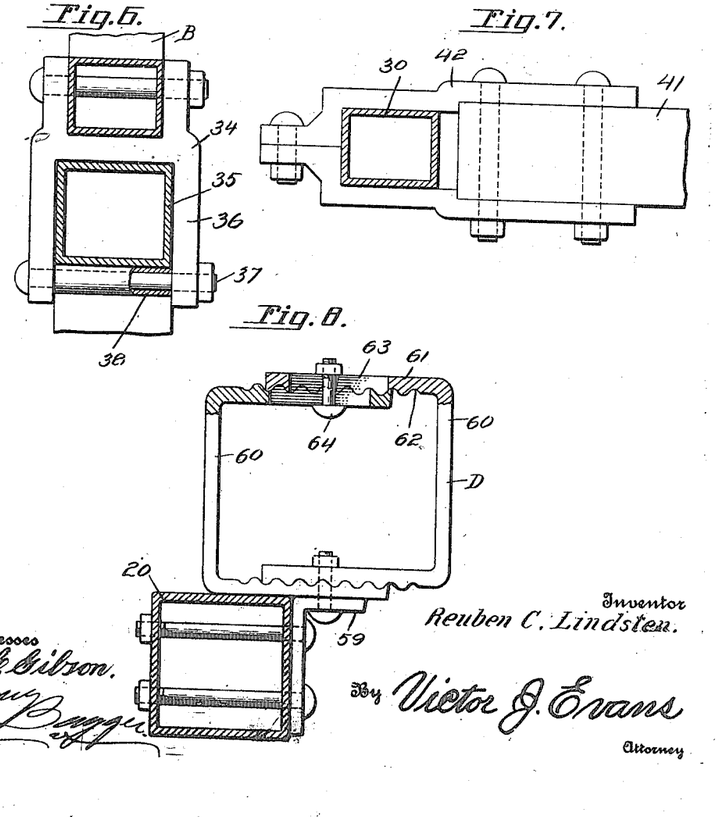
Fig. 6 is a sectional detail view, enlarged, taken on the line 6—6 in Fig. 4.
Fig. 7 is a sectional detail view, enlarged, taken on the line 7—7 in Fig. 3.
Fig. 8 is a sectional detail view, enlarged, taken on the line 8—8 in Fig. 2.
Figure 9:
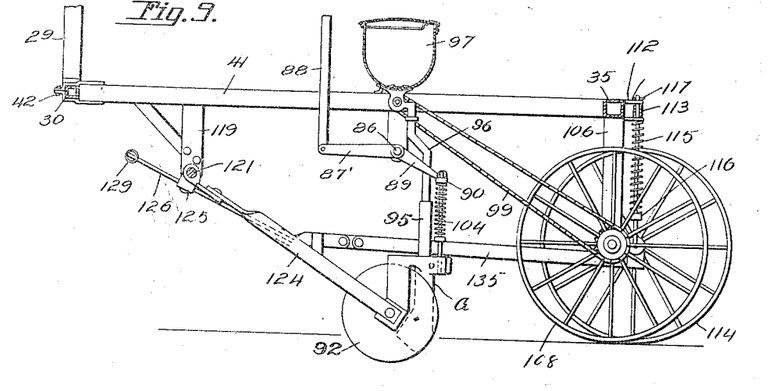
Fig. 9 is a vertical longitudinal sectional view taken on the line 9—9 in Fig. 3.

Connected with and extending downwardly from the rear top bar 21, approximately in alinement with the yokes A, A, are yokes B which have been shown as being constructed of bent metal bars, said yokes being reinforced by obliquely disposed braces 32. The bridge piece 33 of each yoke B is provided with hangers 34 supporting a transversely slidable cross bar 35. These hangers, as will be best seen by reference to Fig. 6, are provided with downwardly extending arms 36 connected by bolts 37 on which anti-friction sleeves 38 are mounted to support the cross bar 35 which will thus be enabled to move transversely of the machine without undue friction. The lower ends of the side members of the yokes A at the front part of the machine are connected with the upper ends of the side members of the yokes B or the points adjacent thereto by means of obliquely disposed brace bars 39, and similar obliquely disposed brace bars 40 extend from the upper ends of the side members of the yokes A to the lower ends of the side members of the yokes B, said yokes being thereby strongly reinforced against movement of their lower ends longitudinally of the machine.

Figure 3:
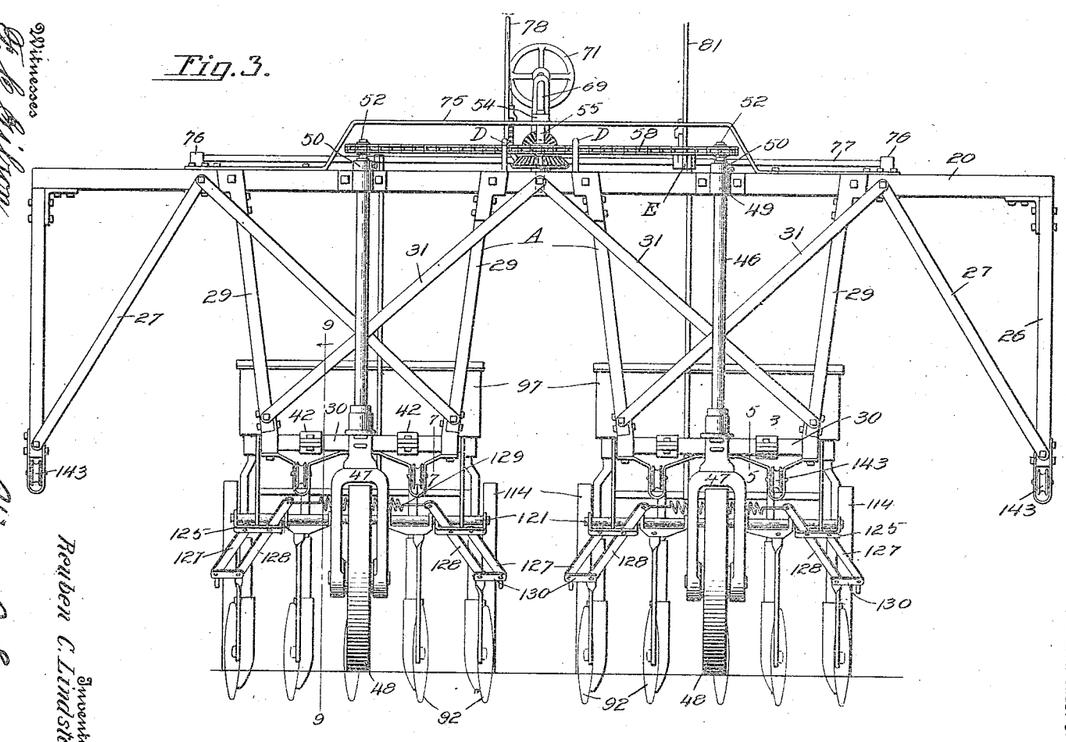
Fig. 3 is a front elevation.
Figure 4:
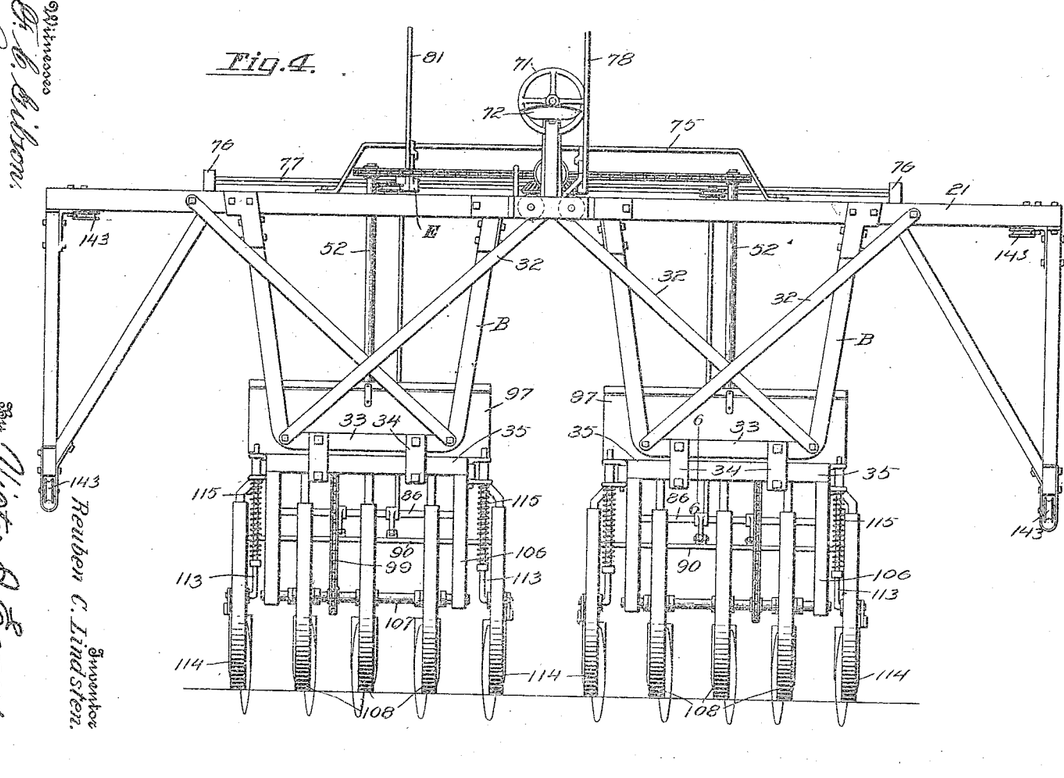
Fig. 4 is a rear elevation.
Figure 5:
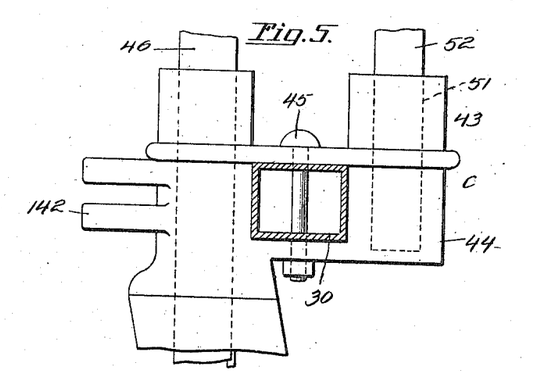
Fig. 5 is a sectional detail view, enlarged, taken on the line 5—5 in Fig. 3.

Each pair of yokes A, B serves to support a complete working seed drill which includes in its construction a pair of beams or longitudinal frame bars 41 which are equipped at their forward ends with clips 42, best seen in Fig. 7, said clips embracing and slidably engaging the cross bar or bridge piece 30 of the yoke A; the rear ends of the beams 41 are rigidly connected with and are spaced apart by the cross bar 35 which slides in the hangers 34. It follows that the beams 35 and all parts connected therewith are capable of sliding transversely with respect to the supporting yokes A, B. For the purpose of effecting transverse movement of the respective drill frames comprising the beams or side members 41 and the cross bars 35 mechanism is provided as follows:

Mounted upon and securely connected with the bridge piece 30 of the yoke A is a clamp member C, best seen in Fig. 5, said clamp member comprising a top member 43 and a bottom member 44 connected together and with the bridge member 30 by means of a bolt 45. The forward part of the clamp member C, in front of the bridge member 30, constitutes a box or bearing for the lower end of a vertical shaft 46 which carries a fork 47 wherein a ground wheel 48 is supported for rotation, as clearly seen in Fig. 3; a bearing 49 for the upper end of the shaft 46 is mounted on the front side of the frame beam 20, and said shaft 46 is provided at its upper end with a set collar 50, whereby it is retained in its bearings. The ground wheel 48 thus constitutes a caster which will readily adapt itself to the direction of draft. The rearward part of the clamp C, in rear of the bridge member 30, is provided with a socket 51 wherein is stepped the lower end of a vertical shaft 52.

Figure 2:
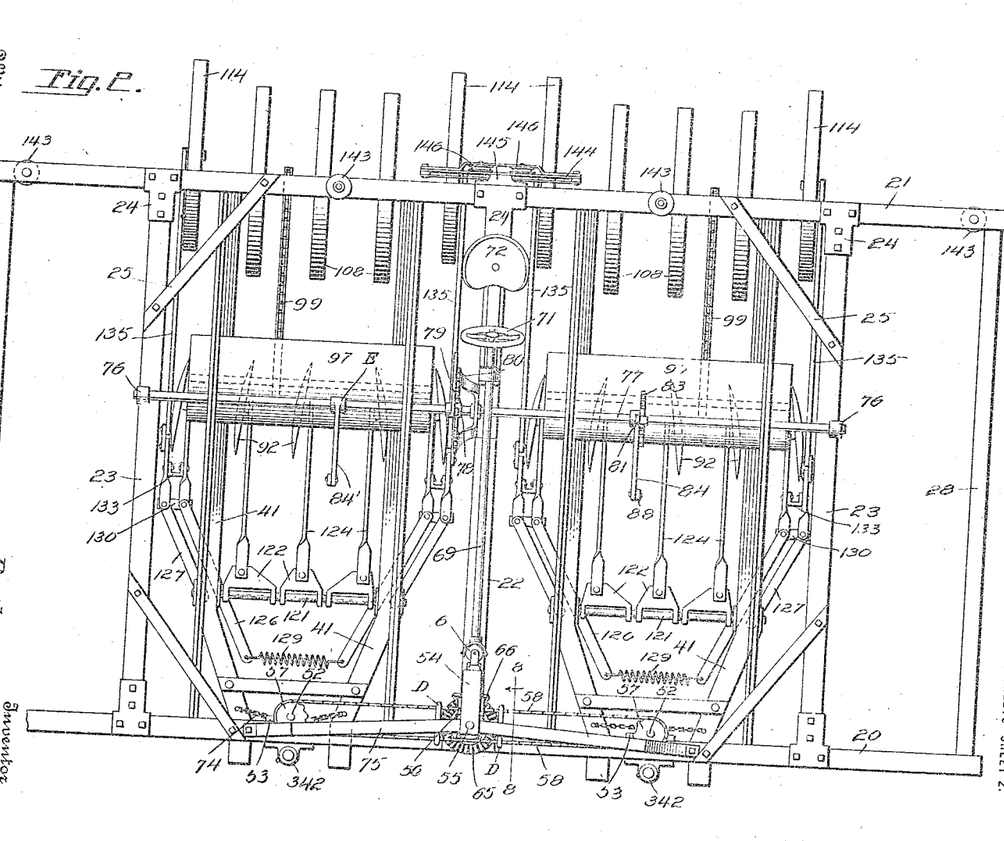
Fig. 2 is a top plan view of the same.

Additional bearings 53 for the upper ends of the shafts 52 are secured on the rear face of the frame bar 20. A bracket 54 which is secured on the central frame bar 22 affords a bearing for a short vertical shaft 55 which will thus be positioned midway between the upper ends of the shaft 52 at the two sides of the frame structure. The shaft 55 carries a sprocket wheel 56, and similar sprocket wheels 57 are mounted on the shafts 52 at or near the upper ends of said shafts. A chain 58 is guided over the sprocket wheels 57 and over the intermediate sprocket wheel 56, the leads of said chain being maintained in constant engagement with said intermediate sprocket wheel by means of clamp members D which are mounted on brackets 59 that are bolted or otherwise secured on the frame bar 20, as best seen in Fig. 8; each of said clamp members comprising a pair of clips 60 of substantially U-shape having overlapping limbs 61, the opposed faces of which are grooved or corrugated, as seen at 62; said limbs being also provided with slots 63 for the passage of connecting bolts 64, whereby said clips may be adjustably connected so as to place the leads of the chain under a sufficient degree of tension to maintain said leads securely in engagement with the sprocket wheel 56. The shaft 55 that carries the sprocket wheel 56 also carries a bevel gear 65 meshing with a bevel pinion 66 on a short shaft 67 supported for rotation in the bracket 54, said shaft being connected by a universal joint 68 with the forward end of an inclined shaft 69, the rear end of which is supported for rotation on a bracket 70 rising from the frame bar 22. The shaft 69 has a hand wheel 71 whereby it may be rotated by the driver or operator whose seat 72 is supported on a spring bar 73 rising from the frame bar 22. The beams or frame bars 41 of each drill frame are connected together near their front ends by means of a flexible member, such as a chain 74, which is wound about one of the shafts 52. Now it will be observed that the operator, by manipulating the hand wheel 71 to rotate the shaft 69 may transmit motion to the shafts 52, rotating said shafts in unison, thereby causing one end of each chain 74 to be unwound and the other end of such chain to be wound about the shaft, and thereby causing movement of the frame beams 41 to the right or to the left, according to the direction of rotation and according to the direction in which the chains 74 are wound about the respective shafts, it being evident that under the arrangement set forth the two shafts 52 will be rotated in one and the same direction. The winding of the chains 74 should, therefore, be reversely about the two shafts, as best seen in Fig. 2, in order that by the rotation of the hand wheel 71, the two frames each including a pair of beams 41 may be moved in the direction of each other or away from each other at the will of the operator, thereby enabling the said drill frames to be variously spaced apart in order to secure the best results. This operation, it will be seen, may be readily performed by the operator while the machine is in motion, and the operator will thus be enabled to control the positions of the drill gangs according to the immediate needs rising from inequalities in the corn rows between which seed is being drilled.

A brace member 75 has been shown as being connected with the bracket 54 and also with the frame bar 20, said brace member serving in a measure to protect the chain 58, and related parts from interference.

Figure 1:
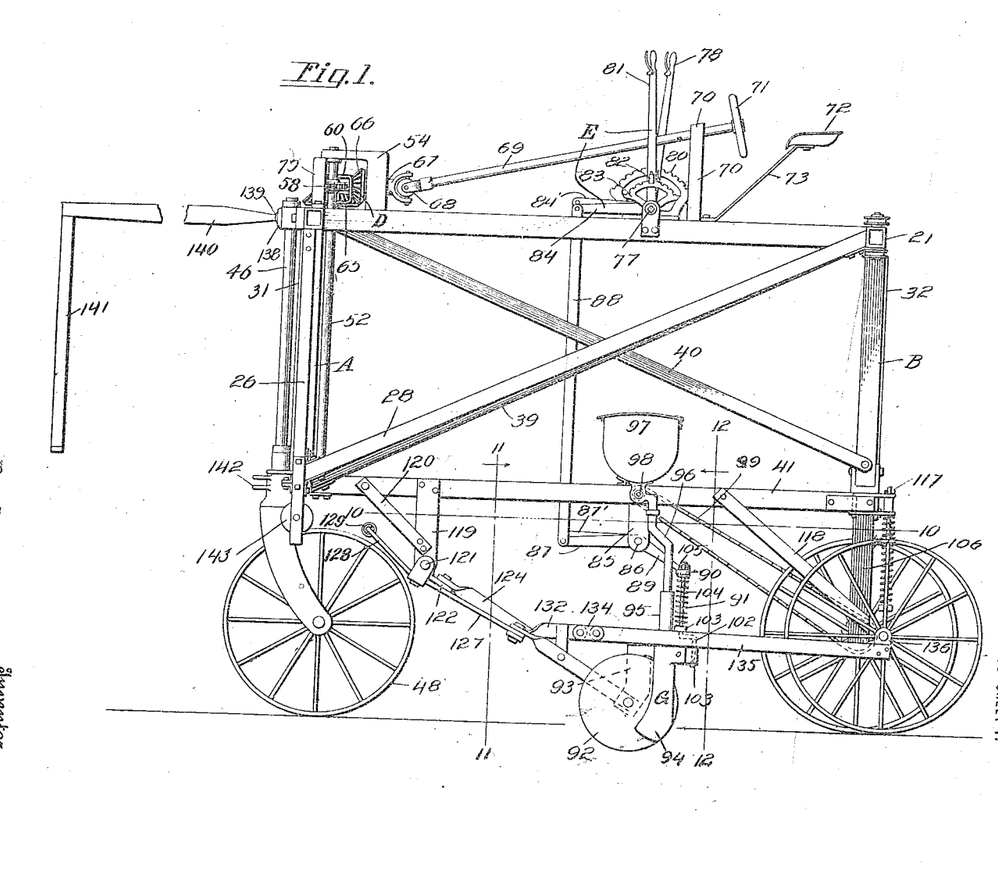
Figure 1 is a side elevation of a machine constructed in accordance with the invention.

Supported for rotation in bearings 76 in the frame bars 23 and extending across the center bar 22 is a rock shaft 77 which is preferably square or non-circular in cross section throughout the major portion of its length, said rock shaft being provided with a hand lever 78 which is positioned in convenient proximity to the driver's seat and which is equipped with a conventional stop member 79 engaging a segment rack 80 that is supported in the center bar 22 of the frame. Mounted loosely on the rock shaft 77 is a bell crank E having an upwardly extending arm 81 which constitutes a hand lever that is equipped with a conventional stop member 82 engaging a segment rack 83 which is fixed on the rock shaft; the other arm of the bell crank E extends forwardly, as shown at 84, see Fig. 1, and constitutes a mate to an arm or crank 84' that is mounted securely on the rock shaft 77 from which it extends forwardly, see Figs. 1 and 2. The beams or frame bars 41 of each drill frame are provided with brackets 85 supporting a rock shaft 86 having a forwardly extending arm, the arm associated with one drill frame being designated by 87, and that associated with the other drill frame being designated by 87', see Fig. 1. The arms 87, 87' are connected by link rods 88 with the respective arms 84, 84'. Now, it will be seen that by adjustment of the bell crank E, the arm 84 may be actuated and adjusted at various angles with respect to the arm 84', thereby actuating the arm 87 and moving said arm to various positions with respect to the arm 87', thus enabling the said arms 87 and 87' which are associated with the two drill gangs to be variously positioned with respect to one another. When such adjustment has been made by means of the bell crank E, any oscillatory motion imparted to the rock shaft 77 by the hand lever 78 will be responded to equally by the arms 87 and 87', as will be readily understood, and the parts controlled by said arms, as will be hereinafter described, will thus be simultaneously and equally adjusted or actuated.

Each rock shaft 86 is provided with a pair of rearwardly extending arms 89 supporting a cross bar 90 which is apertured for the passage of the rods 91 that extend upwardly from the casings or carriers G in which the furrow opening disks 92 are supported for rotation. Each of the carriers G is formed with a disk carrying arm 93 and with a scraper or cleaner 94. Each casing is also provided with an upwardly extending tubular duct 95 in which telescopes the seed duct or spout 96 that extends downwardly from the seed box or hopper 97 which is mounted on the beams or frame bars 41, said hopper containing the customary or conventional drill mechanism which is actuated by a shaft 98 that derives motion through the medium of a chain 99 from a source of power which will be presently described. Each drill frame has been shown as carrying five furrow opening disks which may be faced, as shown, two in one direction and three in another direction. The two outermost disk casings G associated with each drill frame are provided each with a rearwardly extending pivoted lug 100 having a longitudinal slot 101 to receive a crank 102 formed at the lower end of the rod 91 associated therewith. The several rods 91 are equipped with set collars 103 between which and the cross bar 90 springs 104 are coiled about said rods. The rods are slidable through the apertures in the cross bar 90 above which each rod is provided with a key or pin 105 whereby the parts are assembled. It will be understood from the foregoing description that when the rock shaft 86 is oscillated in one direction to move the arms 89 upwardly, the furrow opening disks will be raised from the ground, while oscillation of the rock shaft in the opposite direction will cause the cross bar 90 to bear downwardly against the springs 104, which latter will thus tend to force the disks into the ground. All the disk casings G are similarly connected with the bar 90, but only the two outermost disk casings are provided with the lug 100 and related parts.

Figure 10:
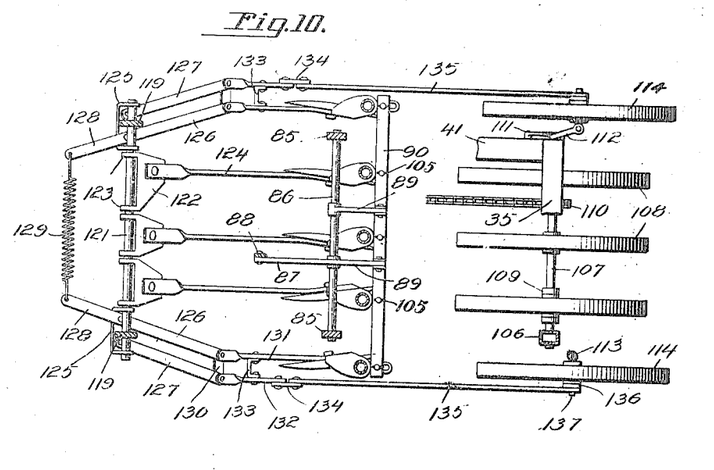
Fig. 10 is a horizontal sectional detail view taken on the line 10—10 in Fig. 1.
Figure 11:
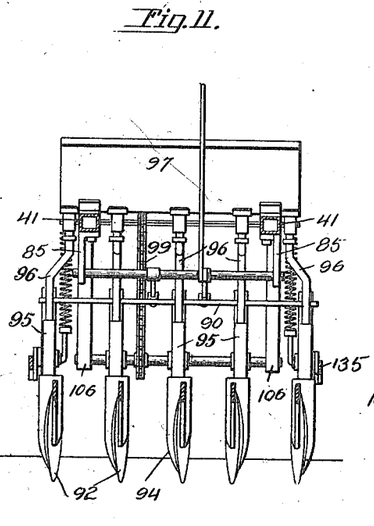
Fig. 11 is a transverse sectional detail view taken on the line 11—11 in Fig. 1.
Figure 12:
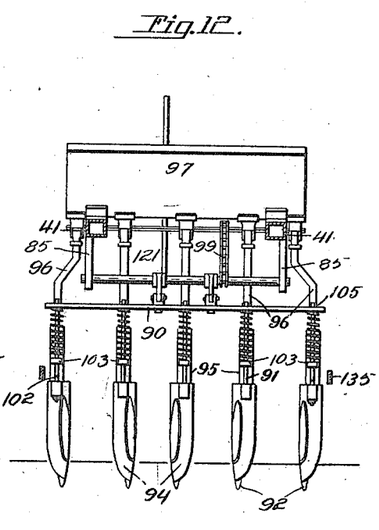
Fig. 12 is a transverse sectional detail view taken on the line 12—12 in Fig. 1.
Figures 13, 14, 15:
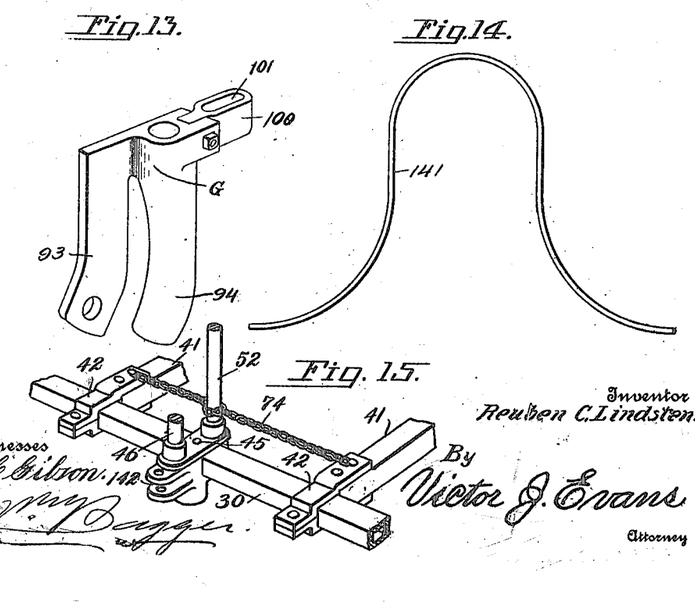
Fig. 13 is a perspective detail view of one of the outermost disk casings G and related parts.
Fig. 14 is a detail view in elevation of the arched neck yoke used in connection with the invention.
Fig. 15 is a perspective detail view of the forward portion of one of the drill frames and related parts.

Each drill frame, comprising a cross bar 35 and side members 41, is provided at the rear ends of said side members with downwardly extending arms or brackets 106 serving to support a shaft 107 on which presser wheels 108 are mounted, said presser wheels being connected with the shaft by means including conventional clutch devices, indicated in Fig. 10 at 109, whereby when the machine is traveling in a forward direction, the shaft 107 will be rotated with the presser wheels. The shaft or axle 107 carries a sprocket wheel 110 over which the chain 99 is guided so as to transmit motion to the shaft 98 in the seed box. The side bars 41 of the drill frame are also provided at their rear ends with keepers 111 in each of which is mounted a yoke 112, the arms of which are apertured for the passage of a vertical rod 113 carrying at its lower end a presser wheel 114, said presser wheel being forced downwardly by a spring 115 coiled about the rod 113 between the yoke 112 and a set collar 116 on said rod, said set collar being adjustable in order that the tension of the spring may be regulated. A pin or key 117 passing through the upper end of the rod 113 serves to assemble it with the yoke 112. Braces 118 serve to connect the arms or brackets 106 with the frame members 41.

The beams or frame members 41 are provided near their forward ends with downwardly extending brackets 119 reinforced by braces 120 and serving to support a shaft 121 on which plates 122 having ears or lugs 123 are mounted, said plates being connected with the disk carrying casings G except the two outermost ones by means of draw bars 124. This connection permits the disk carrying casings to be moved freely up and down by the hereinbefore described means provided for the purpose, and at the same time, a strong connection is afforded between the cross bar or shaft 121 and the disk carrying casings.

The shaft 121 is provided adjacent to the ends thereof with U-shaped supporting members or stirrups 125 on each of which is pivoted a pair of arms 126, 127, said arms extending rearwardly, as clearly seen in Fig. 10, and the inner arms 126 being provided with forward extensions 128 which are connected together by a tension spring 129. The rear ends of the arms 126, 127 are connected together by a spacing member 130, whereby said arms will be maintained in substantially parallel relation; the rear ends of said arms are also connected with the front ends of a pair of links 131, 132 which are connected together by a spacing member 133. The links 131 at the two sides of the frame extend rearwardly and are connected with the disk casings G of the outermost disks; the rear ends of the links 132 are connected by auxiliary links 134 with the forward ends of draw bars 135, the rear ends of which are connected with plates or blocks 136 mounted on the spindles 137 on which the outermost presser wheels 114 are supported for rotation, said spindles being formed or attached to the lower ends of the spring actuated supporting rods 113.

It being understood that the drill devices of the improved machine are to operate in the interspaces between corn rows, and it being well understood that the rows are invariably ridged up toward the plants, the necessity will readily become apparent for mounting the outermost furrow opening disks and the outermost presser wheels independently of the remaining ones and especially in such a manner as to be capable of moving vertically and also laterally independent of the remaining ones. Freedom of vertical movement is necessary because the said outermost furrow opening devices and presser wheels will be compelled to travel on the ridges and, therefore, at a greater elevation than the remaining ones, and the freedom of lateral movement is necessary because at times the said outermost furrow openers and presser wheels will be crowded in an inward direction, and it is desirable that they should be capable of yielding to such crowding to save the parts from undue strain. Now, it will be observed, that by the action of the spring 129, the rear ends of the pivotally supported spaced parallel arms will be forced outwardly, thereby moving in an outward direction the supporting members of the outermost furrow openers and presser wheels, said furrow openers and presser wheels being, therefore, imbued with the tendency to travel on the respective ridges. When, owing to the irregularities in the surface or from other causes, the outermost furrow openers and presser wheels are crowded inward, the said furrow openers and presser wheels will be maintained in their normal positions longitudinally, that is to say, the pitch of the furrow opening disk will not be changed, and the presser wheel will be maintained in a straight position with its axis at right angles to the line of travel; this being due to the herein described arrangement of connecting and supporting members including the cranks 102 and 112.

Mounted centrally on the front top bar 20 is a socket 138 for the reception of a ball member 139 at the rear end of the tongue 140 which extends forwardly, and which carries at its forward end an arched neck yoke 141. This tongue and neck yoke are obviously used only when the machine is used for drilling in a corn field; for open field work it is replaced by an ordinary tongue having hounds which may be connected with lugs 142 that extend forwardly from the clip member C. For corn field work, the draft is applied by means of flexible members, such as chains or cables, for the guidance of which pulleys 143 are suitably arranged in various locations on the frame structure; an evener is provided comprising a frame 144 which is slidably mounted upon a bracket 145 on the rear frame bar 21, said frame serving to support a pair of pulleys 146 over which the draft elements leading to the two sides of the frame may be guided. It will be observed that some of the guide pulleys 143 are arranged at the lower ends of the brackets 26 and others directly in front of the respective drill frames, thus enabling the draft to be so applied that four horses walking abreast may be hitched to the machine, the horses walking in the interspaces where seed is being drilled and also in the interspaces adjacent thereto, thus permitting the four horses to walk abreast in the corn field without injuring the corn.

From the foregoing description, taken in connection with the drawings hereto annexed, the operation and advantages of this invention will be readily understood. It is obvious that seed drilling mechanism of any conventional and well known character may be used, the main purposes of this invention being to provide a frame structure, furrow openers and presser wheels that will lend themselves with particular readiness to the planting of fall crops in the corn fields where the corn has already attained considerable maturity, as is frequently required in the great corn growing States. The machine is obviously supported in transit, partly on the front wheels 48 and partly on the presser wheels; and by the simple mechanism provided the furrow openers of the two drilling devices may be raised or lowered to place them into or out of the ground simultaneously or independently, as may be required, the mechanism being also of such a nature that the furrow openers of the two drilling devices may be simultaneously adjusted without being set at various elevations. The general construction of the machine is simple and inexpensive, and it will be found thoroughly efficient for the purposes for which it is provided.

In the appended claims, for convenience, the drill devices will be referred to as "drill units"; it being understood that each drill unit includes a pair of frame beams 41, a rear bar 35 and the hopper, furrow openers, presser wheels and other related parts carried by such frame structure.

Having thus described the invention, what is claimed as new, is:—

1. In a machine of the class described, a carrying frame including front and rear top bars, pairs of yokes depending therefrom, and drill units connected with said yokes, each of said drill units comprising side beams, a rear bar spacing and connecting said beams, brackets depending from said beams and carrying a rock shaft provided with rearwardly extending arms, a cross bar connected with said arms, and a plurality of casings each carrying a furrow opener and each having an upwardly extending spring pressed rod extending through and connected with the cross bar; and means for actuating the rock shafts of the drill units.

2. In a machine for drilling seed in the interspaces between rows of growing corn, a drill unit including a frame, intermediate furrow openers and presser wheels incapable of lateral movement with respect to the frame, outer furrow openers and presser wheels independently supported for lateral movement with respect to the frame, and means whereby said outer furrow openers and the presser wheels are normally forced outward, that is to say, in the direction of the rows of corn between which seed is being drilled.

3. In a machine for drilling seed in the interspaces between rows of growing corn, a pair of drill units, a carrying frame including top bars having depending yokes with which said drill units are slidably connected. and means for effecting lateral adjustment of the drill units, each of said drill units including a plurality of furrow openers and a plurality of presser wheels, some of said furrow openers and presser wheels being laterally movable independently of the remaining furrow openers and presser wheels.

4. In a machine for drilling seed in the interspaces between rows of growing corn, a pair of drill units, a carrying frame including front and rear top bars having depending yokes with which the drill units are connected, and means for effecting lateral adjustment of the drill units; each of said drill units including a rock shaft having rearwardly extending arms, a cross bar carried by said arms, and a plurality of furrow openers connected and vertically adjustable with the cross bar; the rock shaft of each drill unit having a forwardly extending crank; in combination with a rock shaft supported in the carrying frame, means for actuating said rock shaft and for securing it at various adjustments, an arm extending radially from said rock shaft, a link connecting said arm with the crank of one drill unit, a bell crank fulcrumed on the rock shaft and having a forwardly extending arm, a link connecting said arm with the crank of the other drill unit, and means for securing the bell crank at various adjustments with respect to the rock shaft on which it is fulcrumed.

5. In a machine for drilling seed in the interspaces between rows of growing corn, a drill unit including a frame and a plurality of furrow openers, a plurality of ground engaging presser wheels, arms depending from the frame and having bearings, a shaft supported in said bearings and carrying the aforesaid presser wheels, keepers mounted on the frame, yokes in said keepers, vertical shafts supported on the yokes and movable therewith, and auxiliary presser wheels carried by said shafts.

6. In a machine for drilling seed in the interspaces between rows of growing corn, a drill unit including a frame and a plurality of furrow openers, a plurality of ground engaging presser wheels, arms depending from the frame and having bearings, a shaft supported in said bearings and carrying the aforesaid presser wheels, keepers mounted on the frame, yokes in said keepers, vertical shafts supported on the yokes and movable therewith, auxiliary presser wheels carried by said shafts, and springs whereby the shafts carrying the auxiliary presser wheels are resiliently supported against upward movement.

7. In a machine of the class described, a drill unit including a frame having side beams, a rear cross bar, and brackets depending from the rear ends of the side beams, a shaft supported for rotation in said brackets, presser wheels on said shaft, a shaft supported near the front ends of the side beams, plates pivoted on said shaft and having rearwardly extending draw bars, disk carriers with which said draw bars are connected, stirrups mounted on the ends of the shaft, pairs of arms pivoted on said stirrups, one bar of each pair being provided with a forward extension, a spring connecting said extensions, spacing and connecting members for the arms, auxiliary disk casings and auxiliary presser wheels at the two sides of the drill unit, members connecting said auxiliary disk casings and presser wheels with the rear ends of the arms, supports for the auxiliary disk casings and presser wheels including crank members whereby said disk casings and presser wheels are free to move in a horizontal plane, and means for supporting and for effecting vertical adjustment of the primary and auxiliary disk casings.

8. In a machine of the class described, a drill unit having primary disk carrying casings and auxiliary disk carrying casings, the latter being supported for lateral movement with respect to the former, and means whereby the primary and auxiliary disk casings are connected and supported for vertical adjustment.

9. In a machine of the class described, a drill unit including primary and auxiliary disk carrying casings, the latter being supported for lateral movement with respect to the former, said auxiliary casings having rearwardly extending longitudinally slotted lugs pivotally connected therewith, a rock shaft having rearwardly extending arms, a cross bar carried by said arms, rods extending upwardly from the disk carrying casings through said cross bar and connected therewith against withdrawal, some of said rods having cranks operating in the slotted lugs of the auxiliary casings, springs coiled about said rods and tending to force the disk casings downward, and means for actuating the rock shaft.

10. In a machine of the class described, a drill unit including a frame, a hopper supported thereon and containing an operating shaft, an axle supported by the frame, ground engaging presser wheels on said axle, means for transmitting motion from the axle to the operating shaft, and auxiliary presser wheels supported for lateral movement with respect to the primary presser wheels.

In testimony whereof I affix my signature in presence of two witnesses.

REUBEN C. LINDSTEN.

Witnesses:
 J. H. NELSON,
 L. C. HUCK.